United States Patent [19]
Nomoto et al.

[11] Patent Number: 5,547,643
[45] Date of Patent: Aug. 20, 1996

[54] APPARATUS FOR TREATING FLUE GASES BY IRRADIATION WITH ELECTRON BEAMS

[75] Inventors: Masao Nomoto; Kenji Fujita; Hideo Hayashi, all of Kanagawa-ken, Japan

[73] Assignee: Ebara Corporation, Tokyo, Japan

[21] Appl. No.: 518,578

[22] Filed: Aug. 15, 1995

[30] Foreign Application Priority Data

Aug. 16, 1994 [JP] Japan ................................ 6-192504
Aug. 11, 1995 [JP] Japan ................................ 7-205565

[51] Int. Cl.$^6$ ........................................... B01J 19/12
[52] U.S. Cl. ................. 422/186.04; 422/907; 422/168; 422/172; 422/174
[58] Field of Search .................. 422/186, 906, 422/168, 172, 174, 186.04; 204/156, 164

[56] References Cited

U.S. PATENT DOCUMENTS

| | | | |
|---|---|---|---|
| 4,294,674 | 10/1981 | Aoki et al. | 204/157.1 H |
| 4,324,759 | 4/1982 | Aoki et al. | 422/62 |
| 4,435,260 | 3/1984 | Koichi et al. | 204/164 |
| 4,595,569 | 6/1986 | Reuter et al. | 422/186 |
| 4,650,555 | 3/1987 | Read et al. | 204/174 |
| 4,752,450 | 6/1988 | Dietrich et al. | 422/186 |
| 4,882,020 | 11/1989 | Maezawa et al. | 204/157.3 |
| 4,943,356 | 7/1990 | Dietrich | 204/157.3 |
| 4,961,830 | 10/1990 | Aoki et al. | 204/157.3 |
| 4,969,984 | 11/1990 | Kawamura et al. | 204/157.3 |
| 5,246,554 | 9/1993 | Cha | 204/157.3 |
| 5,397,444 | 3/1995 | Zimer et al. | 204/157.3 |
| 5,467,722 | 11/1995 | Meratla | 110/345 |

FOREIGN PATENT DOCUMENTS

0460230  12/1991  European Pat. Off. .
WO93/11855  6/1993  WIPO .

*Primary Examiner*—Donald F. Walsh
*Assistant Examiner*—Daniel Jenkins
*Attorney, Agent, or Firm*—Oblon, Spivak, McClelland, Maier & Neustadt, P.C.

[57] ABSTRACT

In the improved apparatus for treating flue gases by irradiation with electron beams, ammonia is added at a position in the direction of the flue gas stream that is upstream of the center of electron beams applied within the reactor and which is not more than 2.5 times the range of electron beams, preferably not more than 2.0 times, more preferably not more than 1.5 times, most preferably from 0.5 to 1.0 times said range. Ammonia is supplied in any one of the following ways; (1) only ammonia is supplied; (2) both ammonia and air are supplied; (3) both ammonia and water are supplied; and (4) ammonia, air and water are all supplied. From an operational viewpoint, ammonia is preferably supplied as diluted in the form of a mixture of heated ammonia and dry air (having preferably a dew point of −15° C. or less at one atmosphere). It is also effective to supply ammonia through pipes that are arranged to contour the spherical divergence of electron beams. The apparatus reduces the addition of ammonia to the necessary minimum amount to meet two requirements simultaneously, the one for improving the efficiency of denitration and the other for reducing the amount of leak ammonia to several tens of ppm.

7 Claims, 7 Drawing Sheets

APPARATUS FOR TREATING FLUE GASES BY IRRADIATION WITH ELECTRON BEAMS

BACKGROUND OF THE INVENTION

1. Field of the Invention

This invention relates to an apparatus for treating flue gases such that the feed flue gas is mixed with ammonia and irradiated with electron beams to be freed of nitrogen oxides and/or sulfur oxides.

2. Prior Art

Conventionally, the diffusion and mixing of ammonia in a flue gas has been improved either by injecting ammonia at a position upstream of or near the inlet to the reactor so that it will stay within the flue gas for a prolonged time or by using a punching metal for mixing with the gas.

It is generally held that denitration and desulfurization reactions proceed almost simultaneously and the low efficiency of denitration has primarily been ascribed to insufficient mixing and diffusion of ammonia and this is why nobody has ever thought of adding ammonia at a position closer to the region of irradiation with electron beams.

With the recent enforcement of more rigorous regulations in respect to the concentration of leak ammonia in flue gases, it has been necessary to control the leak ammonia. In fact, however, ammonia has been supplied in excessive amounts in the prior art in order to ensure that denitration and desulfurization reactions proceed in the desired direction. But then the excessive addition of ammonia causes an increased amount of ammonia to remain in the flue gas. Since the current regulations on the emission of flue gases requires that not only $NO_x$, $SO_x$ and dust but also leak ammonia be controlled on the emission, it has been necessary for the ammonia to be injected at an optimal position in the necessary minimum amount which ensures the desired efficiency of denitration and desulfurization reactions.

SUMMARY OF THE INVENTION

An object of the invention is to provide an apparatus for treating flue gases by irradiation with electron beams that reduces the addition of ammonia to the necessary minimum amount to meet two requirements simultaneously:

one for improving the efficiency of denitration and the other for reducing the amount of leak ammonia to several tens of ppm.

To attain this objective, the position where ammonia is added is specified by the distance from the zone of irradiation with electron beams and brought closer to, rather than farther from, the irradiation zone within the reactor. This is also effective in reducing the concentration of leak ammonia to a low level. If ammonia is added at the conventional position, desulfurization reaction will first take place, followed then by denitration reaction, in a temperature range of about 60°–80°C.; hence, before the supplied flue gas reaches the irradiation zone, part of the ammonia added is spent in the thermochemical desulfurization reaction. On the other hand, the greater the excess of ammonia, the higher the efficiency of denitration but, in fact, part of the added ammonia is spent in the desulfurization reaction and the progress of denitration reaction will not be as thorough as it is desired. This would be the cause of the lower efficiency of denitration than that of desulfurization.

DETAILED DESCRIPTION OF THE INVENTION

In the invention, ammonia is added at a position in the direction of the flue gas stream that is upstream of the center of electron beams applied within the reactor and which is not more than 2.5 times the range of electron beams, preferably not more than 2.0 times, more preferably not more than 1.5 times, most preferably from one half to a value equal to said range. Considering various factors such as the conditions of the flue gas, the desired denitration and desulfurization, efficiency and the limitations of the processing apparatus, ammonia is supplied in any one of the following ways; (1) only ammonia is supplied; (2) both ammonia and air are supplied; (3) both ammonia and water are supplied; and (4) ammonia, air and water are all supplied. From an operational viewpoint, ammonia is preferably supplied as diluted in the form of a mixture of heated ammonia and dry air (having preferably a dew point of −15° C. or less at open atmosphere). It is also effective to supply ammonia through pipes that are arranged to contour the spherical divergence of electron beams.

As already mentioned, ammonia has conventionally been added at a position upstream the flue gas stream in the reactor in order to enhance the diffusion and mixing of ammonia in the flue gas. However, this has caused the desulfurization reaction to proceed faster than the denitration reaction and part of the added ammonia is spent to retard the progress of the latter reaction thereby reducing its efficiency.

Figure 4:
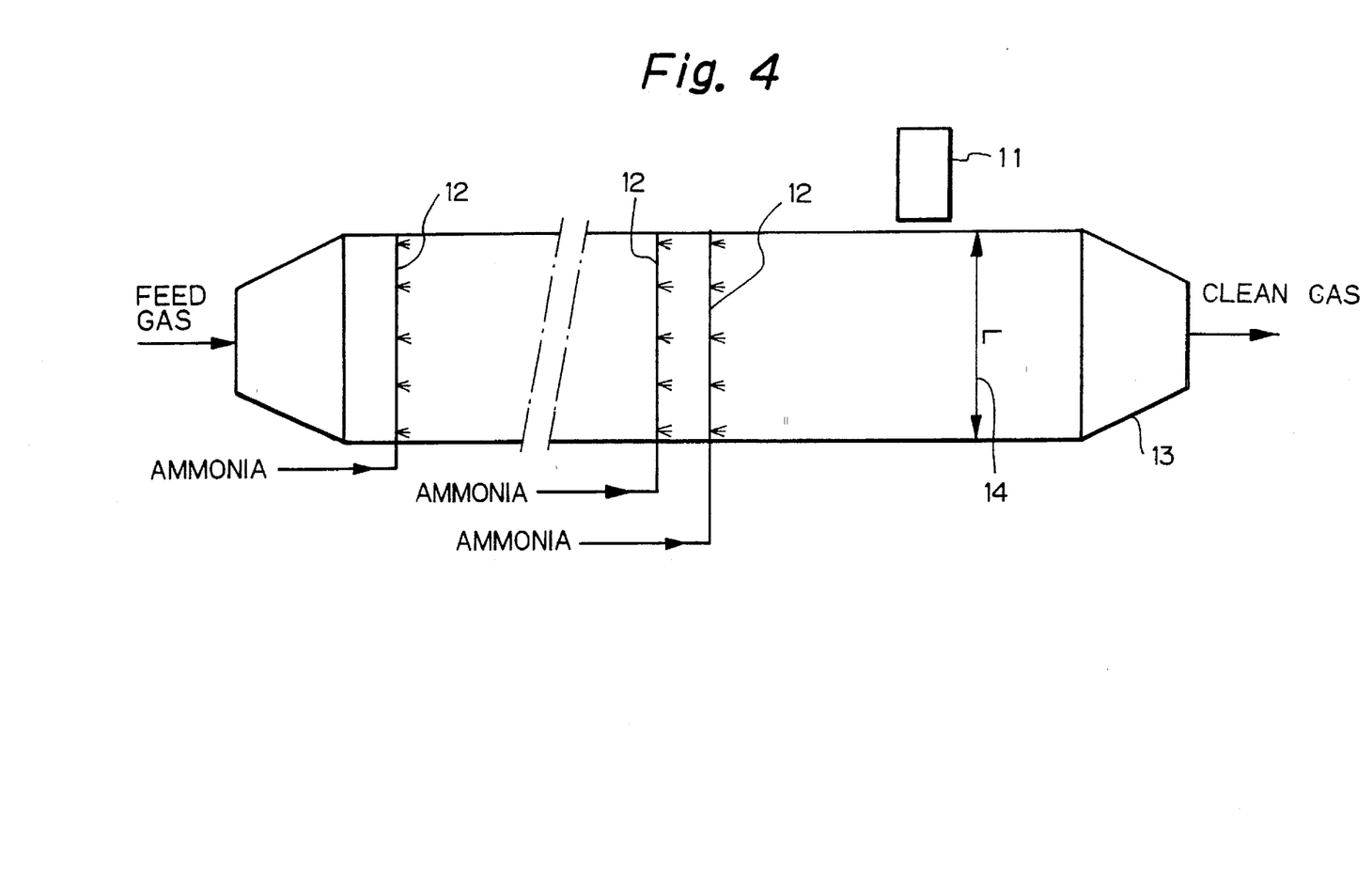
FIG. 4 is a diagram showing the positions of ammonia addition that were adopted in the performance test.
Figure 5:
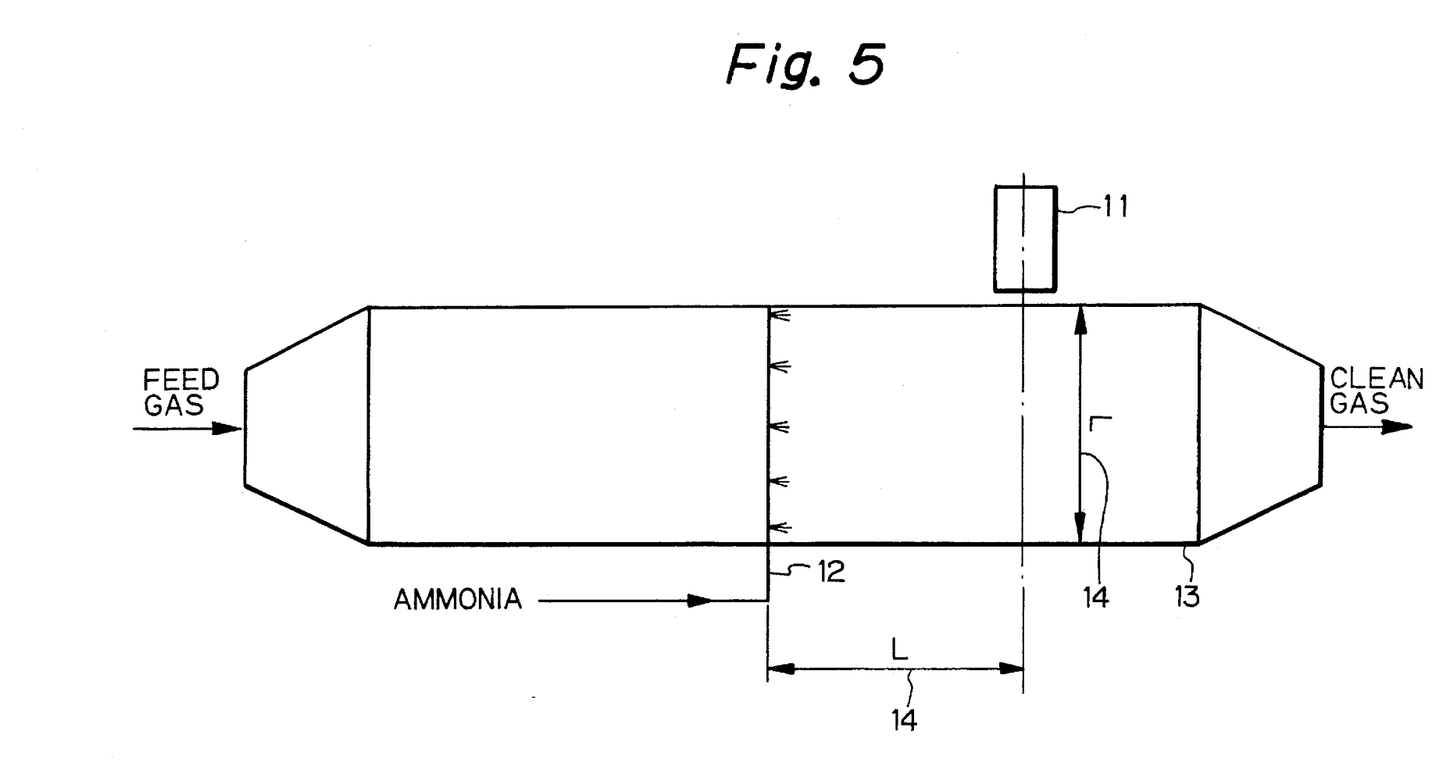
FIG. 5 is a diagram showing an exemplary position of ammonia addition according to the invention.
Figure 6:
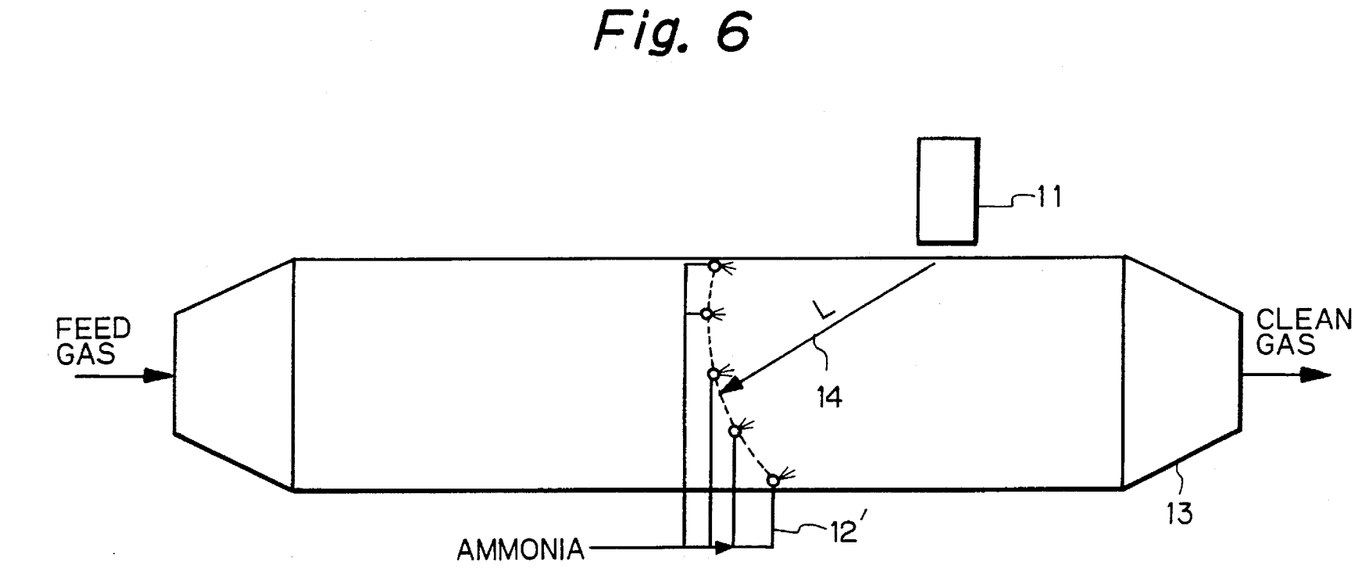
FIG. 6 is a front view showing the positions of ammonia addition that were adjusted to contour the divergence of electron beams emitted in the invention.
Figure 7:
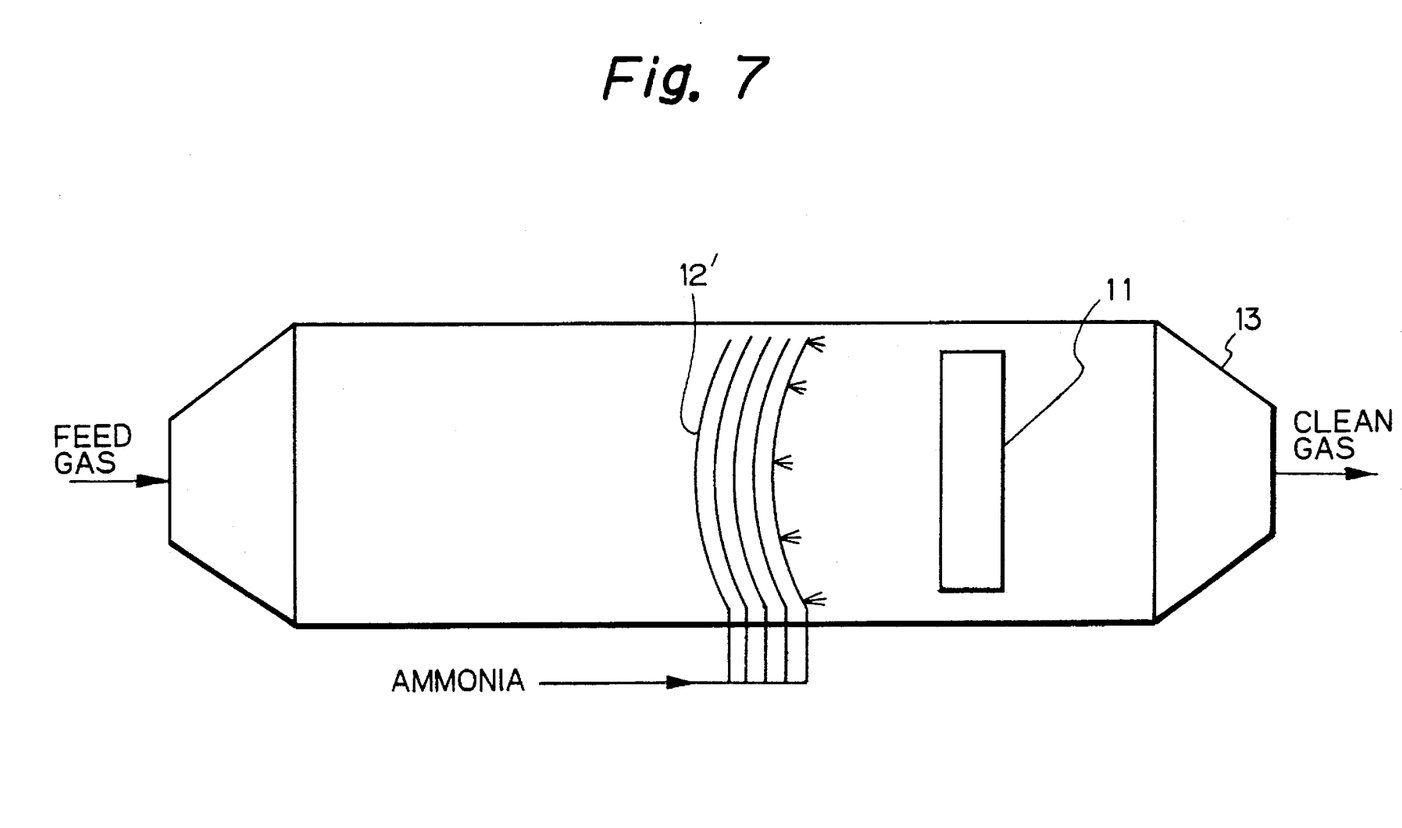
FIG. 7 is a plan view corresponding to FIG. 6.

The present invention solves this problem by adding ammonia at positions which, as shown in FIG. 4, are upstream, in the direction of the flue gas stream, of the center of electron beams applied within the reactor and which are no more than 2.5 times the range of electron beams, preferably not more than 2.0 times, more preferably not more than 1.5 times, most preferably from one half to a value equal to said range. If this arrangement is adopted, the amount of ammonia that would otherwise be spent in the desulfurization reaction is reduced and the amount of ammonia that contributes to the denitration reaction is increased, accordingly, thereby accomplishing an improvement in the denitration efficiency. However, the intended effect of the invention is not attained if ammonia is added at a position more than 2.5 times the range of electron beams. If, on the other hand, ammonia is added at a position that is unduly close to the zone of irradiation with electron beams, part of the applied electron beams will impinge on some of the ammonia feed pipe and this not only results in the loss of electron beam's energy but also the ammonia feed pipe that is being struck by electron beams will become so hot that a need arises to employ a special provision that inquires safety.

The following example is provided for the purpose of further illustrating the invention but is in no way to be taken as limiting.

EXAMPLE 1

A flue gas was treated in a reactor 13 (see FIG. 4) having a cross section of 1,100 $mm^H \times 1,000 mm^W$ by irradiation with electron beams applied from an electron beam generator 11. Ammonia diluted about 100 folds with dry air (having a dew point of −15° C. at one atmosphere) was supplied through a feed pipe 12 and added at three positions that were upstream the flow of the flue gas by distances of 1,100 mm (equal to the range of electron beams that is indicated by 14 in FIG. 4 and which is determined considering the loss of electron beams that is caused by the window in the zone of irradiation with electron beams as they are generated from the electron beam generator 11 at an acceleration voltage of 0.5 MeV), 1,500 mm and 4,000 mm, with the conditions for irradiation with electron beams being held constant. The denitration and desulfurization efficiency that could be achieved was calculated. The test conditions are listed in Table 1 and a flow-sheet for the general layout of the test facilities is shown in FIG. 1.

Figure 1:
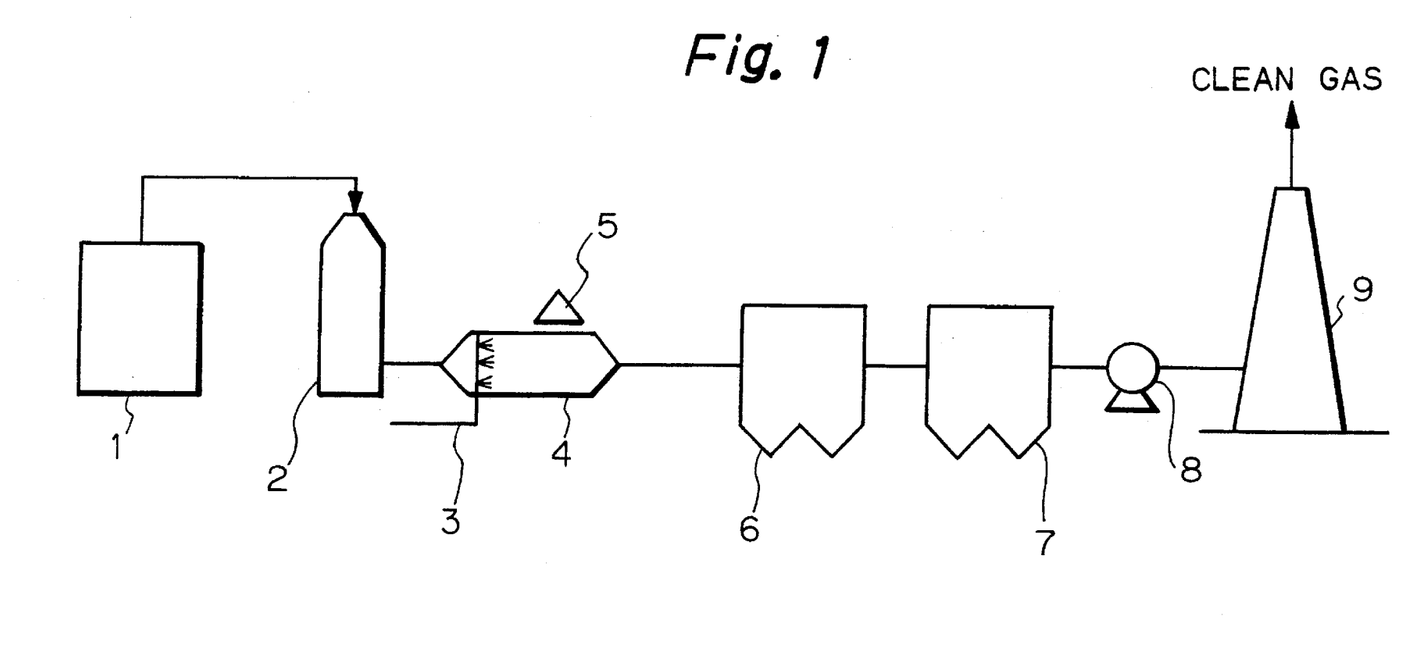
FIG. 1 is a flow chart of the facilities used to test the performance of the apparatus of the invention.

Referring to FIG. 1, a flue gas containing $SO_x$ and/or $NO_x$ that has been generated in a boiler 1 is cooled in a cooling tower 2 and introduced to a reactor 4, which is also supplied with ammonia through a feed pipe 3. The flue gas is irradiated with electron beams from an electron beam generator 5 so that $SO_x$ and $NO_x$ are converted to ammonia sulfate and ammonia nitrate, respectively, in a solid form, which are subsequently trapped by an electric precipitator 6 and a bag filter 7. The clean gas is thereafter discharged into the atmosphere via a suction fan 8 and a stack 9.

TABLE 1

| Parameter | | Value |
|---|---|---|
| Flow rate of flue gas, m³/h (N.T.P., dry) | | 1600 |
| Acceleration voltage, MeV | | 0.5 |
| Current, mA | | 25.0 |
| Composition of flue gas | $NO_x$, ppmV (dry) | 170–190 |
| | $SO_2$, ppmV (dry) | 700–800 |
| | $O_2$, % (wet) | 8–9 |
| | $H_2O$, % (wet) | 9–10 |
| | $CO_2$, % (wet) | 9–10 |
| | $N_2$, % (wet) | 71–74 |

Figure 2:
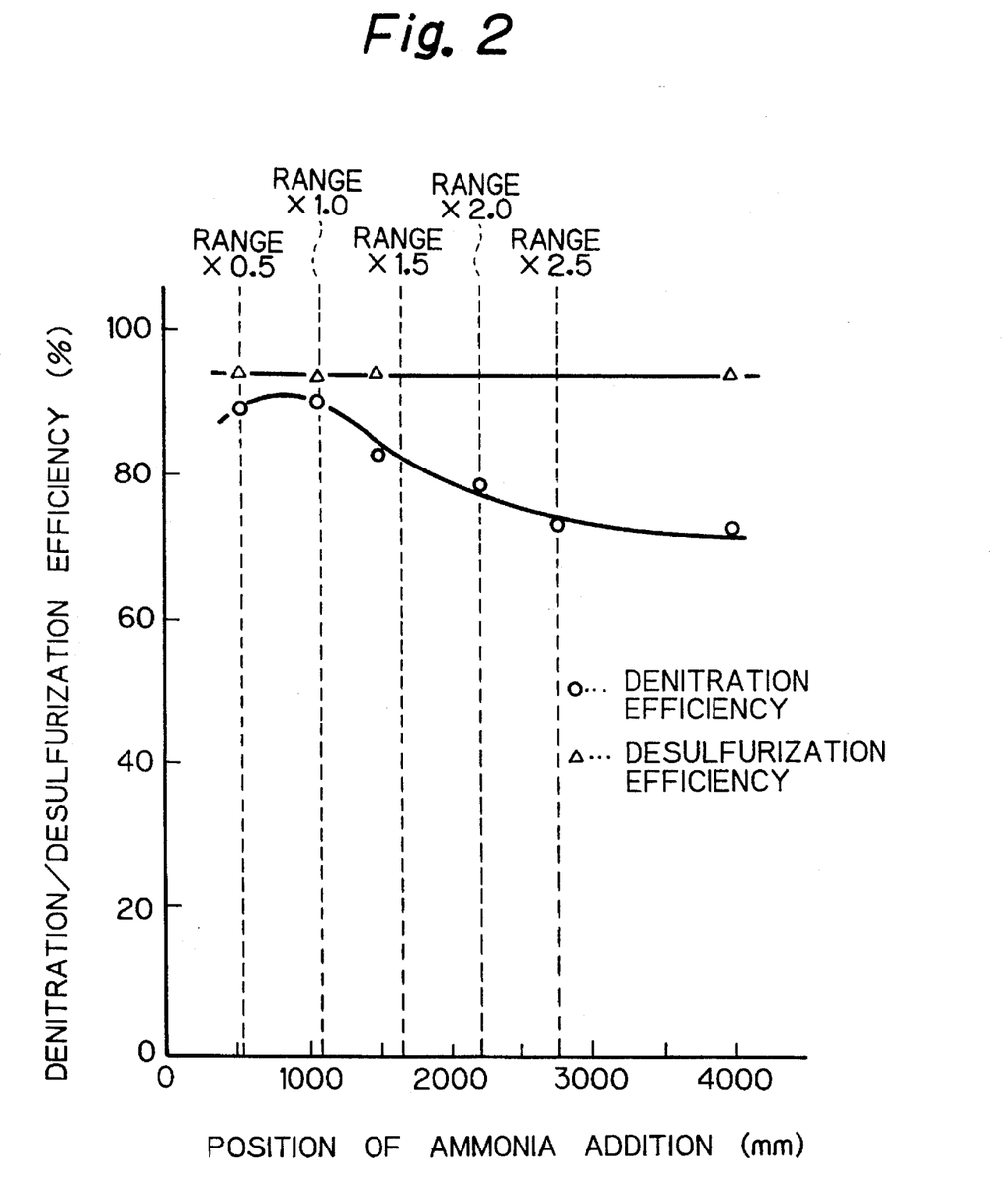
FIG. 2 is a graph showing the relationship between the position of ammonia addition and each of the denitration and desulfurization efficiencies.
Figure 3:
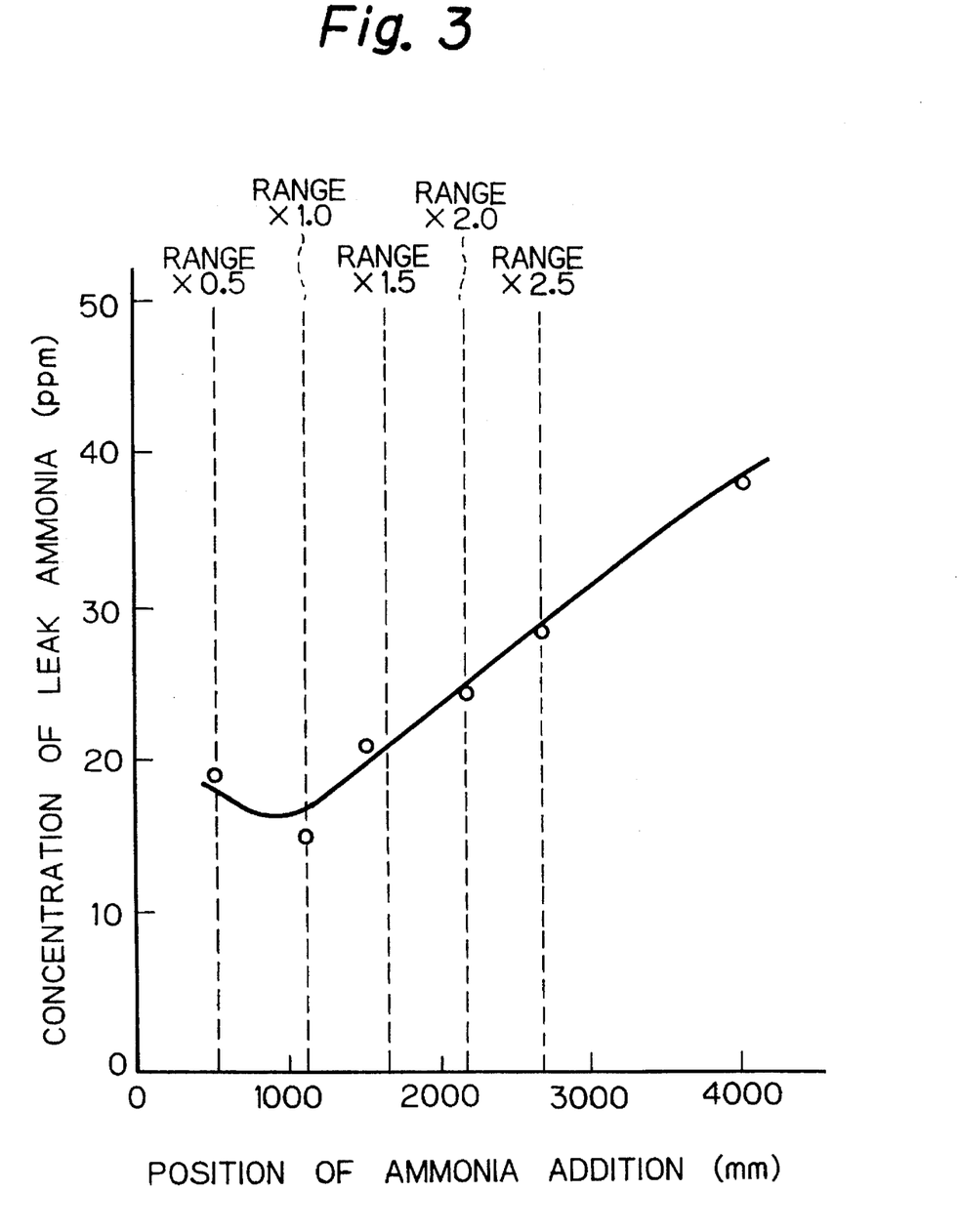
FIG. 3 is a graph showing the relationship between the position of ammonia addition and the concentration of leak ammonia.

The test results are shown in Table 2 and in FIGS. 2 and 3.

TABLE 2

| | Position of ammonia addition, mm | | | | | |
|---|---|---|---|---|---|---|
| Parameter | 550 | 1100 | 1500 | 2200 | 2750 | 4000 |
| $NO_x$ at entrance, ppm (dry) | 177 | 170 | 183 | 175 | 181 | 179 |
| $NO_x$ at exit, ppm (dry) | 22 | 17 | 33 | 37 | 45 | 51 |
| $SO_2$ at entrance, ppm (dry) | 780 | 800 | 790 | 790 | 800 | 770 |
| $SO_2$ at exit, ppm | 55 | 56 | 55 | 55 | 56 | 54 |

TABLE 2-continued

| | Position of ammonia addition, mm | | | | | |
|---|---|---|---|---|---|---|
| Parameter | 550 | 1100 | 1500 | 2200 | 2750 | 4000 |
| (dry) | | | | | | |
| Denitration efficiency, % | 88 | 90 | 82 | 79 | 75 | 72 |
| Desulfurization efficiency, % | 93 | 93 | 94 | 93 | 93 | 93 |
| Leak ammonia, ppm (dry) | 19 | 15 | 21 | 25 | 29 | 38 |

Obviously, the denitration efficiency improved and yet the amount of leak ammonia decreased when ammonia was added in positions that were upstream the center of electron beams by the distances within the reactor no more than 2.5 times the range of electron beams, preferably not more than 2.0 times, more preferably not more than 1.5 times, most preferably from 0.5 to 1.0 times the range of electron beams. In the test range, the desulfurization efficiency was comparable to the values achievable in the prior art.

The maximum thickness of a given medium that can be penetrated by an electron accelerated at a voltage of E (0.01 MeV<E<2.5 MeV) is called the "range" of the electron, which is expressed by the following empirical formula:

$$R=(0.412 \cdot E^{1.256-0.09541 \ln E})/\rho$$

where R is the range (cm) of an electron, E is the acceleration voltage (MeV) and $\rho$ is the density of a medium (g/cm³).

The results of range calculation for acceleration voltages of 0.5—1.0 MeV are shown in Table 3 without taking into account the energy loss caused by the window through which electron beams were applied from the electron beam generator. In the example, the range of electron beams was assumed to be 1,100 mm at an acceleration voltage of 0.5 MeV considering the scattering of electron beams and the energy loss caused by the window.

TABLE 3

| Acceleration voltage, MeV | Range, cm |
|---|---|
| 0.5 | 125 |
| 0.6 | 165 |
| 0.7 | 200 |
| 0.8 | 240 |
| 0.9 | 280 |
| 1.0 | 320 |

According to the invention, ammonia is added at a position in the direction of a flue gas stream that is upstream of the center of electron beams being applied within a reactor by a distance no more than 2.5 times the range of electron beams, preferably not more than 2.0 times, more preferably not more than 1.5 times, most preferably from 0.5 to 1.0 times the range of the electron beams and this is effective in improving the denitration efficiency and yet reducing the concentration of leak ammonia to several tens of ppm. As a result, the denitration efficiency which was no more than 80% in the prior art can be increased to as high as 85–90% in the invention if the electron beam generator used produces the same output. This means a comparable denitration efficiency to the prior art apparatus can be accomplished even if the output of the electron beam generator is reduced. Further, the operating cost of utilities in the treatment of flue gases by irradiation with electron beams is reduced and this adds the advantage of lower energy to the existing benefits of treating flue gases by irradiation with electron beams.

What is claimed is:

1. In an apparatus for treating flue gases such that the feed flue gas is mixed with ammonia and irradiated with electron beams to be freed of nitrogen oxides and/or sulfur oxides, the improvement wherein ammonia is added at a position in the flow of the flue gas that is upstream of the center of the electron beams being applied within a reactor by a distance no more than 2.5 times the range of the electron beams.

2. An apparatus according to claim 1, wherein said distance is no more than 2.0 times the range of the electron beams.

3. An apparatus according to claim 1, wherein said distance is no more than 1.5 times the range of the electron beams.

4. An apparatus according to claim 1, wherein said distance is from one half to a value equal to the range of the electron beams.

5. An apparatus according to claim 1, wherein ammonia is supplied in any one of the following ways; (1) only ammonia is supplied; (2) both ammonia and air are supplied; (3) both ammonia and water are supplied; and (4) ammonia, air and water are all supplied.

6. An apparatus according to any one of the preceding claims, wherein ammonia is added through pipes that are arranged to contour the spherical divergence of the applied electron beams.

7. An apparatus according to claim 5, wherein both ammonia and air are supplied such that ammonia is mixed for dilution with dry air having a dew point of $-15°$ C. or less at one atmosphere.

* * * * *